(12) United States Patent
Wnek (10) Patent No.: US 7,142,728 B2
(45) Date of Patent: Nov. 28, 2006

(54) METHOD AND SYSTEM FOR EXTRACTING INFORMATION FROM A DOCUMENT

(75) Inventor: Janusz Wnek, Germantown, MD (US)

(73) Assignee: Science Applications International Corporation, San Diego, CA (US)

( * ) Notice: Subject to any disclaimer, the term of this patent is extended or adjusted under 35 U.S.C. 154(b) by 786 days.

(21) Appl. No.: 10/146,959

(22) Filed: May 17, 2002

(65) Prior Publication Data

US 2003/0215137 A1    Nov. 20, 2003

(51) Int. Cl.
*G06K 9/34* (2006.01)
*G06K 9/36* (2006.01)
*G06K 9/32* (2006.01)

(52) U.S. Cl. .................... 382/294; 382/290; 382/173

(58) Field of Classification Search ............... 382/181, 382/294, 290, 173
See application file for complete search history.

(56) References Cited

U.S. PATENT DOCUMENTS

| | | | |
|---|---|---|---|
| 5,140,650 A | 8/1992 | Casey et al. ................. 382/61 |
| 5,258,855 A | 11/1993 | Lech et al. ................. 358/462 |
| 5,293,429 A * | 3/1994 | Pizano et al. ............... 382/202 |
| 5,369,508 A | 11/1994 | Lech et al. ................. 358/462 |
| 5,416,849 A | 5/1995 | Huang ........................ 382/173 |
| 5,625,465 A | 4/1997 | Lech et al. ................. 358/462 |
| 5,692,073 A | 11/1997 | Cass .......................... 382/219 |
| 5,721,940 A | 2/1998 | Luther et al. ............... 395/767 |
| 5,748,809 A | 5/1998 | Hirsch ........................ 382/317 |
| 5,768,416 A | 6/1998 | Lech et al. ................. 382/180 |
| 5,848,186 A | 12/1998 | Wang et al. ................ 382/176 |
| 5,950,196 A | 9/1999 | Pyreddy et al. ................ 707/5 |
| 6,009,196 A | 12/1999 | Mahoney ..................... 382/176 |
| 6,094,505 A | 7/2000 | Lech et al. .................. 382/180 |

OTHER PUBLICATIONS

Wnek, Janusz, "High Performance Inductive Document Classifier," *SAIC Science and Technology Trends II*, 5 pp., Abstract [retrieved on Oct. 5, 2001], Retrieved from the Internet: http://publications.saic.com/satt.nsf/06.../6cae12cebbf749f88256665007e88c2?Open Document (1 p.).

"Unstructured Document Processing," © 1995-2001 [retrieved on Aug. 29, 2001], Retrieved from the Internet: http://www.miteksys.com/dynafind.html, 2 pp.

"Mitek Announces New Product Strategy Focused on E-Commerce Solutions—New Partnerships and Products Expected to Contribute to Future Revenue," Release Date: Feb. 23, 2000 [retrieved on Mar. 27, 2001], Retrieved from the Internet: http://www.miteksys.com/press49.html, 6 pp.

(Continued)

*Primary Examiner*—Joseph Mancuso
*Assistant Examiner*—Hadi Akhavannik
(74) *Attorney, Agent, or Firm*—Kilpatrick Stockton LLP (57) ABSTRACT

A computer-implemented method for extracting information from a population of subject documents. The method includes modeling a document structure. The modeled document structure includes at least a document component hierarchy with at least one record type. Each record type includes at least one record part type and at least one record part type comprising at least one data element type. For a subject document exhibiting at least a portion of the modeled document structure, preferred embodiments of the invention identifying data of a type corresponding to at least one modeled data element type. Identified subject document data is then associated with the corresponding modeled data element type.

3 Claims, 11 Drawing Sheets

Horizontal offset between two aligning line patterns.

OTHER PUBLICATIONS

"How to Automatically Process Unstructured Forms," techinfocenter.com, © 2000, 16 pp.

"Processing Unstructured Documents," A Technical White Paper, May 6, 1999, 8 pp.

"A Perspective on Document Understanding," A Technical White Paper, Apr. 26, 1999, 7 pp.

Summers, K., "Near-Wordless Document Structure Classification," in *Proc. of the 3rd Int. Conf. on Document Analysis and Recognition*, IEEE Computer Society Press, Los Alamitos, CA, 1995.

Esposito, F., Malerba, D., and Semeraro, G., "Multistrategy Learning for Document Recognition," *Applied Artificial Intelligence*, vol. 8, pp. 33-94, 1994.

Dengel, A., "ANASTASIL: A System for Low-Level and High-Level Geometric Analysis of Printed Documents," in *Structured Document Image Analysis*, H. S. Baird, H. Bunke, K. Yamamoto (Eds.), Springer-Verlag, Berlin, 1992.

Hurst, Matthew Francis, "The Interpretation of Tables in Text," *PhD Thesis*, the University of Edinburgh, 2000, 325 pp.

Lopresti, Daniel and Nagy, George, "A Tabular Survey of Automated Table Processing," in *Graphics Recognition: Recent Advances*, Springer-Verlag, Berlin, 2000, vol. 1941 of Lecture Notes in Computer Science, pp. 93-120.

Wnek, Janusz, "InTeGen v.1.2: Inductive Template Generator," *User's Guide*, SAIC CM No.: SAIC-99/1346&-InTeGen-UG-01-U-R0C2, SAIC, Vienna, VA, Nov. 24, 1999, 23 pp.

Kieninger, Thomas G., "Table Structure Recognition Based on Robust Block Segmentation," 1998, *Proceedings of SPIE*, Vo. 3305, Document Recongnition V, pp. 22-32.

Hori, Osamu and Doermann, David S., "Robust Table-Form Structure Analysis Based on Box-Driven Reasoning," 1995, ICDAR-95 Proceedings, pp. 218-221.

\* cited by examiner

| | 100 | 101 |
|---|---|---|
| Date: 11/25/2000 | | Page: 45 |
| Agent: 27783 | | Check number: 178829 |
| | | Check date: 10/30/00 |
| If you have any questions contact: | Maryland General Company | |
| | P.O. Box 29000 | |
| | Baltimore, MD 21201 | |

CLAIM DETAIL SECTION
Name: Matthew John                Account #: 230-17-9980
ID: 13579-SP                      Group #: 228578
Provider: ANX Center              Inventory #: 79928773

| SERVICE DATES | PROCEDURE | DEDUCTIBLE | PAYMENT |
|---|---|---|---|
| 09/07/1999 | 893990 | 17.50 | 10.00 |
| 09/07/1999 | 893997 | .00 | 500.00 |
| 09/07/1999 | 893777 | 150.00 | 1000.00 |
| 09/07/1999 | 893778 | .00 | 1000.00 |
| 09/07/1999 | 893779 | .00 | 100.00 |
| 09/07/1999 | 893780 | .00 | 200.00 |
| 09/07/1999 | 893781 | .00 | 300.00 |
| 09/07/1999 | 893782 | .00 | 400.00 |
| 09/07/1999 | 893784 | .00 | 500.00 | 104

106

| PAGE TOTALS: | 4510.00 |
|---|---|

| TOTAL PAID: | .00 |
|---|---|

~~~~~~~~~~~~~~~~~~~~~~~~ *[end of page]* 102 ~~~~~~~~~~~~~~~~~~~~~~~~

103

| Date: 11/25/2000 | 108 | Page: 46 |
|---|---|---|
| Agent: 27783 | | Check number: 178829 |
| | | Check date: 10/30/00 |
| If you have any questions contact: | Maryland General Company | |
| | P.O. Box 29000 | |
| | Baltimore, MD 21201 | |

CLAIM DETAIL SECTION    110
Name: Matthew John (continued)        Account #: 230-17-9980

| SERVICE DATES | PROCEDURE | DEDUCTIBLE | PAYMENT |
|---|---|---|---|
| 09/07/1999 | 893782 | .00 | 100.00 |
| 09/07/1999 | 893783 | .00 | 200.00 |
| 09/07/1999 | 893784 | .00 | 700.00 |
| TOTALS: | | .00 | 5510.00 |
| | | TOTAL PAID: | 10.00 |

BALANCE DUE: 5500.00

106

| PAGE TOTALS: | 1000.00 |
|---|---|

| TOTAL PAID: | 10.00 |
|---|---|

Figure 1. Example of a Long Record Broken by the End of a Page.

Figure 2. Example of a record consisting of a header, a table and a footer

300

| Date: 11/25/2000 | Page: 44 |
| --- | --- |
| Agent: 27783 | Check number: 178829 |
| | Check date: 10/30/00 |
| If you have any questions contact: | Maryland General Company |
| | P.O. Box 29000 |
| | Baltimore, MD 21201 |

310

CLAIM DETAIL SECTION
Name: John Paul                    Account #: 230-17-9980    325
ID: 13579-SP          327         Group #: 228578
Provider: ANX Center              Inventory #: 79928773

| SERVICE DATES | PROCEDURE | DEDUCTIBLE | PAYMENT |
| --- | --- | --- | --- |
| 09/07/1999 | 893990 | 17.50 | 10.00 |
| 09/07/1999 | 893997 | 00.00 | 500.00 |
| 09/07/1999 | 893777 | 150.00 | 2500.00 |
| TOTALS: | 329 | 167.50 | 3010.00 |
| | | TOTAL PAID: | 1000.00 |

322

BALANCE DUE: 2010.00

CLAIM DETAIL SECTION
Name: Marie Ann                   Account #: 432-17-2265    325
ID: 15579-SP          327         Group #: 2548578
Provider: USC Center              Inventory #: 724448773

| SERVICE DATES | PROCEDURE | DEDUCTIBLE | PAYMENT |
| --- | --- | --- | --- |
| 09/07/1999 | 893690 | 00.00 | 10.00 |
| TOTALS: | 329 | 00.00 | 10.00 |
| | | TOTAL PAID: | 10.00 |

324

BALANCE DUE: .00

330

PAGE TOTALS:                                          3020.00
                                         TOTAL PAID: 1010.00

320

Figure 3. Example of a document page with structural patterns decomposed into three different records (record "claim detail section" has two instances).

Figure 4. Data element selection and definition.

CLAIM DETAIL SECTION

Name: John Paul
ID: 13579-SP    Account #: 230-17-9980
Provider: ANX Center    Group #: 228578
                        Inventory #: 79928773

| SERVICE DATES | PROCEDURE | DEDUCTIBLE | PAYMENT |
|---|---|---|---|
| 09/07/1999 | 893990 | 17.50 | 10.00 |
| 09/07/1999 | 893997 | .00 | 500.00 |
| 09/07/1999 | 893777 | 150.00 | 2500.00 |

TOTALS:         167.50      3010.00
TOTAL PAID: 1000.00
BALANCE DUE: 2010.00

Figure 5. Alternative selection and definition of various data elements including data grouping and meta-data extraction

| | |
|---|---|
| Input Line: | Name: John Paul    Account #:   230–17–9980 |
| Generalization Variation 1 (num ): | Name: John Paul    Account #:   999-999-9999 |
| Generalization Variation 2 (num + alpha): | Name: Xxxx Xxxx    Xxxxxxx #:   999-999-9999 |
| Generalization Variation 3 (num + data): | Name: Xxxx Xxxx    Account #:   999-999-9999 |

601
602
603

Figure 6.   Three Variations of Generalizing a Line into a Line Pattern

```
typedef struct line_pattern {
    CString  name;                      // Source document name
    int      lidx;                      // Source line index
    int      genLevel;                  // Generalization level
    CString  text;                      // Line pattern
    int      *chx;                      // Array with character x-positions
    int      *chwidth;                  // Array with character widths
    int      nAlpha;                    // Number of alpha characters
    int      nDigit;                    // Number of digit characters
    int      nOther;                    // Number of other than alpha, digit, non-spa characters
    int      nMatch;                    // Number of meta-words
    int      nAlign;                    // Number of aligned words of any type
    double   dmaxAlignDistRatio Pos;    // Alignment dist based ratio for similar lines
    double   dminAlignDistRatioNeg;     // Alignment dist based ratio for dissimilar lines
    double   dEditDistRatio;            // Edit distance ratio
} line_pattern;
```

702 — CString name
704 — int lidx
706 — int genLevel / CString text
708 — int *chx / int *chwidth
710 — int nAlpha / int nDigit / int nOther
712 — int nMatch / int nAlign
714 — double dmaxAlignDistRatio Pos / double dminAlignDistRatioNeg
716 — double dEditDistRatio Figure 7. Line pattern data structure.

```
typedef struct record {
    CString   name;                    // Source document name
    int       x,y,w,h;                 // Position and size int       LineFrom;                // RECORD SCOPE line [from]
    int       LineTo;                  // RECORD SCOPE line [to]
    int       T_LineFrom;              // TABLE SCOPE line [from]
    int       T_LineFrom;              // TABLE SCOPE line [to]

lpList    stopHdrUP;               // Lines preceding the header (list of line patterns)
    lpList    stopHdrDN;               // Lines following the header lpList    stopTblUP;               // Lines preceding the table
    lpList    stopTblDN;               // Lines following the table lpList    stopFtrUP;               // Lines preceding the footer
    lpList    stopFtrDN;               // Lines following the footer lpList    stopPgTop;               // Lines preceding all records on the page
    lpList    stopPgBottom;            // Lines following all records on the page
} record;
```

Figure 8. Record data structure.

```
typedef struct dataElement {
        int        deidx;       // Data element index
        CString    name;        // Source document name
        int        x,y,w,h;     // Position and size
        int        LineFrom;    // Data element scope line [from]
        int        LineTo;      // Data element scope line [to]
} dataElement;
```

900
902 — deidx
904 — name
906 — x,y,w,h
908 — LineFrom, LineTo

Figure 9. Data element data structure.

Figure 10. Horizontal offset between two aligning line patterns.

Figure 11. Data element capture.

METHOD AND SYSTEM FOR EXTRACTING INFORMATION FROM A DOCUMENT

CROSS REFERENCE TO RELATED APPLICATIONS

The present application hereby incorporates by reference in its entirety U.S. patent application Ser. No. 09/518,176, entitled "Machine Learning of Document Templates for Data Extraction," filed Mar. 2, 2000.

FIELD OF THE INVENTION

The present invention relates to methods and systems for extracting information (e.g., data with context) from a document. More specifically, preferred embodiments of the present invention relate to extraction of information from printed and imaged documents including a regular table structure.

BACKGROUND

From credit card statements, to hospital bills, to auto repair invoices, most of us encounter printed documents containing complex, but mostly regular, data structures on a daily basis. For organizations such as businesses; the federal government; research organizations, and the like, processing data obtained in printed form from various sources and in various formats consumes substantial resources. Both manual and custom/automated solutions have been practiced. Manual solutions are highly resource-intensive and well known to be susceptible to error. Automated solutions are typically customized to a particular form and require source code changes when the subject form changes.

The structural patterns present in such documents are naturally detectable by most of us after a brief examination. Repetitive blocks of data elements typically have a distinct appearance thought through by those who designed the document with the ostensible objective of readability. In addition, for our ability to make up for broken characters and sentences, we can also adjust for small irregularities in the layout of the data. For example, a long table listed on several pages with the sequence of table rows split by page footers and headers.

Our understanding of language helps us in interpreting the content of such documents. For example, most of us have little trouble in distinguishing table header information from table body data. A message such as "continued on reverse side" is readily interpreted to indicate that more data is to be expected on the following page. Also, a reader would not likely confuse "71560" with a date or zip code if it is preceded by "PO BOX."

Our common knowledge of table structure aids us in distinguishing meta-data from data. We expect to find header information at the top of a column in cases where data descriptors do not appear immediately to the left of the data. Small print, special fonts, italics, and boldface type also make a difference in readability of documents containing tabular information. Knowledge of data formats, postal addresses, variations in date forms, meaning of names and abbreviations, spatial clues, and the combinations of these and other features help us in manual processing of documents exhibiting regular structure.

Besides the regular and expected complexity of document and table structures, documents may pose additional challenges for automating the data extraction process. The challenges include sparse tables, tables with rows spanning a varied number of lines, parts of a row not present (missing data elements, lines), extraneous text (special printed notes or handwritten annotations), varied number of records per document page, and records broken by the end of a page. In addition to irregularities related to record structure, such as the previous ones, common problems related to scanning (e.g., skewed and rotated images), as well as OCR errors should be anticipated.

In an illustrative example, FIG. 1 illustrates a multi-page "claim detail section" 100 of a document broken by the end 102 of page 45 101. The break 102 occurs in the middle of a table 104. After the unfinished table, on each page, totals 106 for the page are included. The table is continued on the next page 103 after page header information 108 and an abbreviated identification 110 of the continued record.

Among various research fields that deal with tables are the image analysis and information extraction fields.

Most of the image analysis methods focus on low-level graphical features to determine table segmentation. Some methods employ a line-oriented approach to table extraction. In those methods, lines or other graphical landmarks are identified to determine table cells. Other methods employ a connected component analysis approach.

For example, in the image analysis field, a box-driven reasoning method was introduced to analyze the structure of a table that may contain noise in the form of touching characters and broken lines. See Hori, O., and Doermann, D.S., "Robust Table-form Structure Analysis Based on Box-Driven Reasoning," ICDAR-95 Proceedings, pp.218–221, 1995. In that method, the contours of objects are identified from original and reduced resolution images and contour bounding boxes are determined. These primary boxes and other graphical features are further analyzed to form table cells.

Another category of image analysis approaches accepts input from optical character recognition. In one example, table structure recognition is based on textual block segmentation. Kieninger, T. G., Table Structure Recognition Based on Robust Block Segmentation," *Proceedings of SPIE*, Vol. 3305, Document Recognition V, pp. 22–32, 1998. One facet of that approach is to identify words that belong to the same logical unit. It focuses on features that help word clustering into textual units. After block segmentation, row and column structure is determined by traversing margin structure. The method works well on some isolated tables, however it may also erroneously extract "table structures" from non-table regions.

Despite many years of research toward automated information extraction from tables (and the initial step of recognizing a table in the first place), the problems have still not been solved. The automatic extraction of information is difficult for several reasons.

Tables have many different layouts and styles. Lopresti, D., and Nagy, G., "A Tabular Survey of Automated Table Processing," in *Graphics recognition: Recent Advances*, vol. 1941 of Lecture Notes in Computer Science, pp. 93–120, Springer-Verlag, Berlin, 2000. Even tables representing the same information can be arranged in many different ways. It seems that the complexity of possible table forms multiplied by the complexity of image analysis methods has worked against the production of satisfactory and practical results.

Even though image analysis methods identify table structures and perform their segmentation, they typically do not rely on understanding about the logic of the table. This part is left to the information extraction field. In his dissertation, Hurst provides a thorough review of the current state-of-the-art in table-related research. Hurst, M. F., "The Interpretation of Tables in Texts," *PhD Thesis,* 301 pages, The University of Edinburgh, 2000. Hurst notes that table extraction "has not received much attention from either the information extraction or the information retrieval communities, despite a considerable body of work in the image analysis field, psychological and educational research, and document markup and formatting research." As possible reasons, viewed from an information extraction perspective, Hurst identifies lack of current art and model, no training corporal, and confusing markup standards. Moreover, "through the various niches of table-related research there is a lack of evolved or complex representations which are capable of relating high- and low-level aspects of tables."

The problem of table analysis has been approached from two extremely different directions: one that requires table understanding and another that does not require table understanding. Table understanding typically involves detection of the table logic contained in the logical relationships between the cells and meta descriptors. Meta descriptors are often explicitly enclosed in columns and stub headers or implicitly expressed elsewhere in the document. The opposite approach requires little or no understanding of the logic but focuses on the table layout and its segmentation. This dual approach to table processing is also reflected in patent descriptions.

One group of patents concentrates on the image processing side. For example, Wang et al. in U.S. Pat. No. 5,848,186 analyzes an image to build a hierarchical tree structure for a table. The table structure is constructed as text in the table is detected and arranged in groups reflecting column and row organization. The table structure emerges to some degree but there is no effort to attach any functionality to the extracted groups of texts. Wang, S Y., and Yagasaki, T., "Feature Extraction System for Identifying Text Within a Table Image," U.S. Pat. No. 5,848,186, Dec. 8, 1998.

Another example of a patent with the focus on image processing is one by Mahoney in U.S. Pat. No. 6,009,196. Mahoney, J. V., "Method for Classifying Non-running Text in an Image," U.S. Pat. No. 6,009,196, December 1999. A stated objective of that patent is to provide classification of document regions "as text, a horizontal sequence, a vertical sequence, or a table." The method does not appear to perform any data extraction.

A second group of patents concentrates on retrieving tabular data from textual sources. In general, graphical representation of the document is ignored and what counts is mainly text including blanks between texts. For example, in U.S. Pat. No. 5,950,196 by Pyreddy, table components, such as table lines, caption lines, row headings, and column headings are identified and extracted from textual sources. Pyreddy, P., and Croft, B., "Systems and Methods for Retrieving Tabular Data from Textual Sources," U.S. Pat. No. 5,950,196, September 1999. The system may produce satisfactory results with regard to the data granularity required for human queries and interpretation. However, it would not likely be applicable for database upload applications.

One approach that appears to be missing from the references is to exploit the synergy between our intuitive understanding of documents and advances in image processing and information retrieval. Using a user's input to indicate structural features and a computer's processing power to search out and extract data from such structures offers a promising approach to information extraction from documents exhibiting regular data structures.

SUMMARY OF THE INVENTION

In a preferred embodiment, the invention includes a computer-implemented method for extracting information from a population of subject documents. In that embodiment, the method includes modeling a document structure. The modeled document structure includes at least a document component hierarchy with at least one record type. Each record type includes at least one record part type and at least one record part type comprising at least one data element type. For a subject document exhibiting at least a portion of the modeled document structure, preferred embodiments of the invention identify data of a type corresponding to at least one modeled data element type. Identified subject document data is then associated with the corresponding modeled data element type.

In another preferred embodiment, the invention includes a method for horizontally aligning a first region of a document with a second region of a document where each region is characterized by a plurality of sub-regions. This embodiment includes determining a type for each of a plurality of sub-regions in each region and then determining an edit distance for each typed first region sub-region, typed second region sub-region pair. A first sub-region offset is calculated for those pairs characterized by an edit distance not greater than a threshold. A first region offset is determined as a function of the individual first region sub-region offsets. In a particular embodiment, regions correspond to pages and sub-regions correspond to lines.

DESCRIPTION OF THE SEVERAL VIEWS OF THE DRAWING(S)

Preferred embodiments of the present invention are shown by example and not limitation in the accompanying Figures, in which:

FIG. 1 is an example of a long record, in accordance with a preferred embodiment of the present invention, broken by the end of a page;

DETAILED DESCRIPTION OF THE INVENTION

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

A wide variety of printed documents exhibit complex data structures including textual or numerical data organized in rows and columns, i.e., tables, along with more general structures, one of which may be broadly characterized as consisting of one or more contextually-related elements including possibly tables, i.e., records. Contextual relationship typically binds the data elements together in such structures. The relationship can be communicated by characteristics, such as sequence of occurrence, spatial distribution, and landmark (e.g., keyword, graphical reference) association. In other words, data organized in tables, and more generally in records, presents itself as structural patterns recognizable by detecting the above characteristics, among others.

Figure 2:
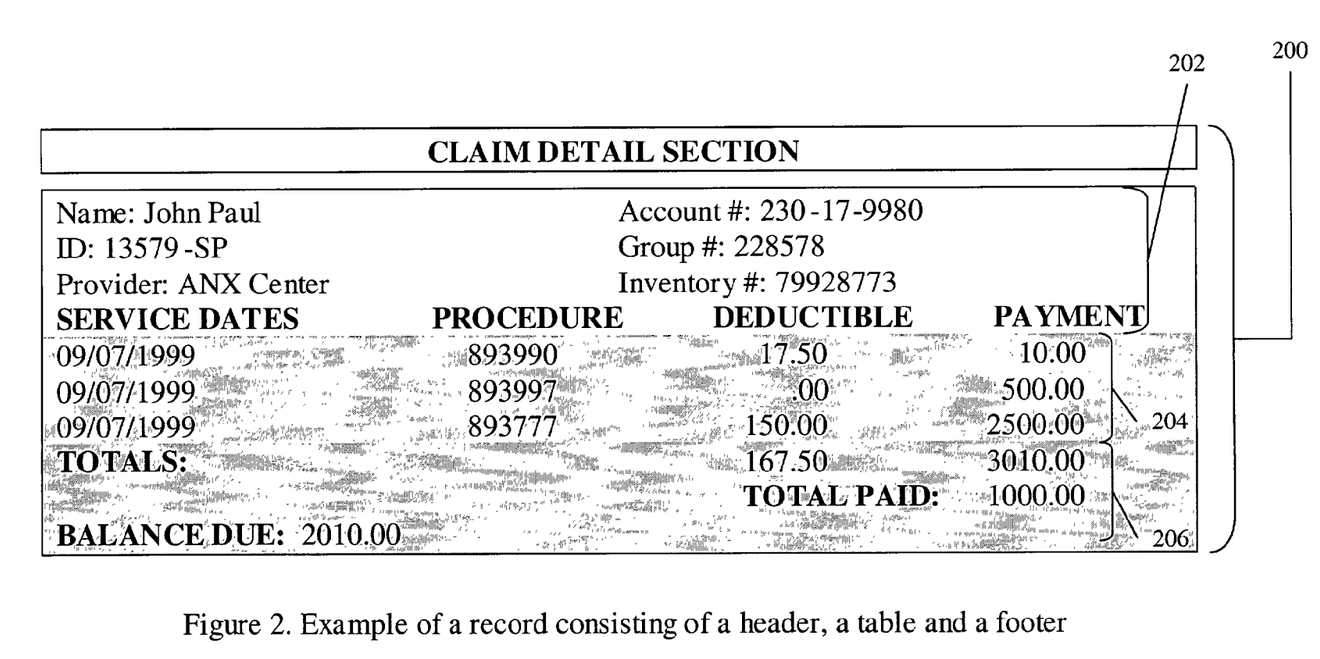
FIG. 2 is an example of a record consisting of a header, a table, and a footer, in accordance with a preferred embodiment of the present invention.

Preferred embodiments of the present invention employ a paradigmatic structure type, i.e., the Flexrecord, to represent structural patterns typically found, for example, in documents such as credit card bills and insurance payment summaries. The Flexrecord type definition includes up to three component types: header, table, and footer. The header includes the set of data elements within a record that are in a specified proximity to the beginning of the record. The table includes the repetitive, variable-length parts of the record. If a record contains a table, a footer may follow as the third component part type of a Flexrecord. The footer includes the set of data between the end of the table and the end of the record. FIG. 2(1) gives an example of a record 200. Lines 1–5 contain a header 202, lines 6–8 contain a table 204, and lines 9–11 contain a footer 206. Given the three components of the record, five variants of records are noted:

Header+table+footer
Header+table
Header
Table+footer
Table

Since footer must appear after the varying part of the record (the table), two combinations (header+footer) and (footer) are not considered. They are just treated as a header.

Figure 3:
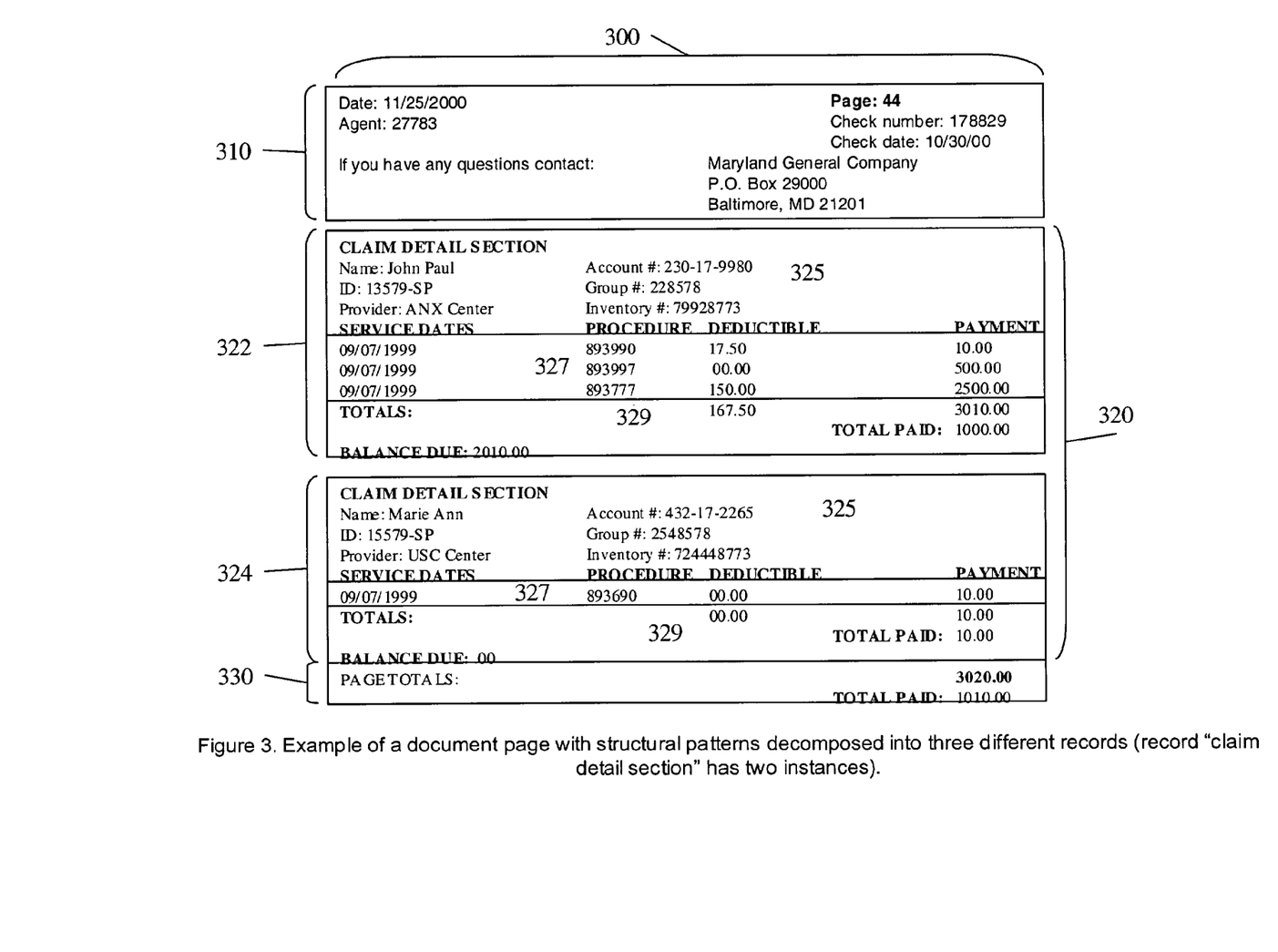
FIG. 3 is an example of a document page with structural patterns decomposed in to three different records in accordance with a preferred embodiment of the present invention.

The complexity of some documents can be addressed by defining more than one record for that document. FIG. 3 shows an example of three different records describing various parts of a document page 300. The first record 310 captures information from the page header. In fact, a Flexrecord header part is sufficient to describe all data elements contained there. Two records 322, 324 of the same type capture the middle part of the page 320. These records 322, 324 involve all three record parts: header 325, table 327, and footer 329. The bottom part of the page 330 can be considered a header part of another record. This combination of records decomposes the problem of data extraction from the document consisting of three structural patterns.

Preferred embodiments of the present invention implement data extraction from complex document structures in two broad steps: training and extraction.

During the training step, a model of the paradigmatic document structure for a population of subject documents is constructed using three inputs: a document component hierarchy (DCH) in the manner of declarations of one or more Flexrecords, spatial and character data from a training document, and information supplied by a user relating the spatial and character data to the DCH hierarchy.

The DCH is built based on a record declaration provided by a user. In preferred embodiments, a user decides the number of records, makes a selection of elementary data elements in each part of the record, assigns a name to each data element, outlines one or more whole records and the table part of each, and saves descriptions in an external file. For example, a record template that reflects the requirement for defining various structural and elementary data elements might be encoded in the following way:

R{number}.{part}{name} where, "R" is an arbitrary letter indicating the record definition, {number} is a number identifying the record, "." is a separator, {part}={{"H", " "}, "T", "F"} is record part indicator, and {name} is a specific name assigned to the data element.

A specific definition of record RI could consist of the following descriptors:

R1—declaring the whole record structure
R1.T—declaring the whole table part of the flex-record
R1.provider, R1.account, R1.group—declaring single data elements in the header part
R1.Tdeductible, R1.Tservice_dates—declaring single data elements in the table part
R1.Ftotal_deductible, R1.Fbalance_due—declaring single data elements in the footer part The spatial distribution of characters and text content of the training document includes character and positional data obtained from Optical Character Recognition (OCR). Each recognizable character in the document is described by its ASCII code, XY position, width, and height. In preferred embodiments of the invention, a document is characterized at several levels of abstraction, e.g., page, line, word, and character levels using data beyond that gathered by conventional OCR.

The page level includes descriptions of all pages included in the document. These include page dimensions and margin offsets. The line level includes total number of document lines; vertical offsets to line bases from the beginning of the document, and numbers of words in each line. An OCR engine predetermines division of a document into lines. The word level includes the total number of document words, horizontal offsets to words' start and end as measured from the line beginning, and number of characters in each word. The character level includes the total number of document characters, horizontal offsets to characters, their widths and heights, as well as the complete document text. The text includes words separated by single spaces; multiple spaces are compressed.

One operation performed in preferred embodiments of the present invention, in order to facilitate accurate measurements, is data horizontal alignment. One source of misaligned data is misaligned pages affected by the scanning or imaging processes. Data alignment also may be needed because data on printed (or electronic) copies may be laid out differently in the original document production system. For instance, odd and even pages may have different margins on the left side.

Data alignment is used in both the training and extraction process of preferred embodiments of the present invention. During training several benchmark statistics over various document and record parts that can involve different pages are gathered. For example, when calculating deviation in distances between similar or dissimilar line patterns the characters in the evaluated lines should be properly aligned. Otherwise, misalignment by a width of one character may produce erroneous data and lead to incorrect decisions.

The data alignment algorithm is based on the same assumption as is the source of the structural patterns: the repeatability of the data and meta-data in the documents of the same type. In other words, if the given document type contains structural data then it should be possible to align data using the algorithm presented below. Data alignment is different from typical page or form alignment that is based on the assumption that there exist so-called registration marks on pages or forms. Such marks may be preprinted on the page or a fragment of a form, or in some instances, graphics (logos, form lines) can be used for registration.

Figure 10:
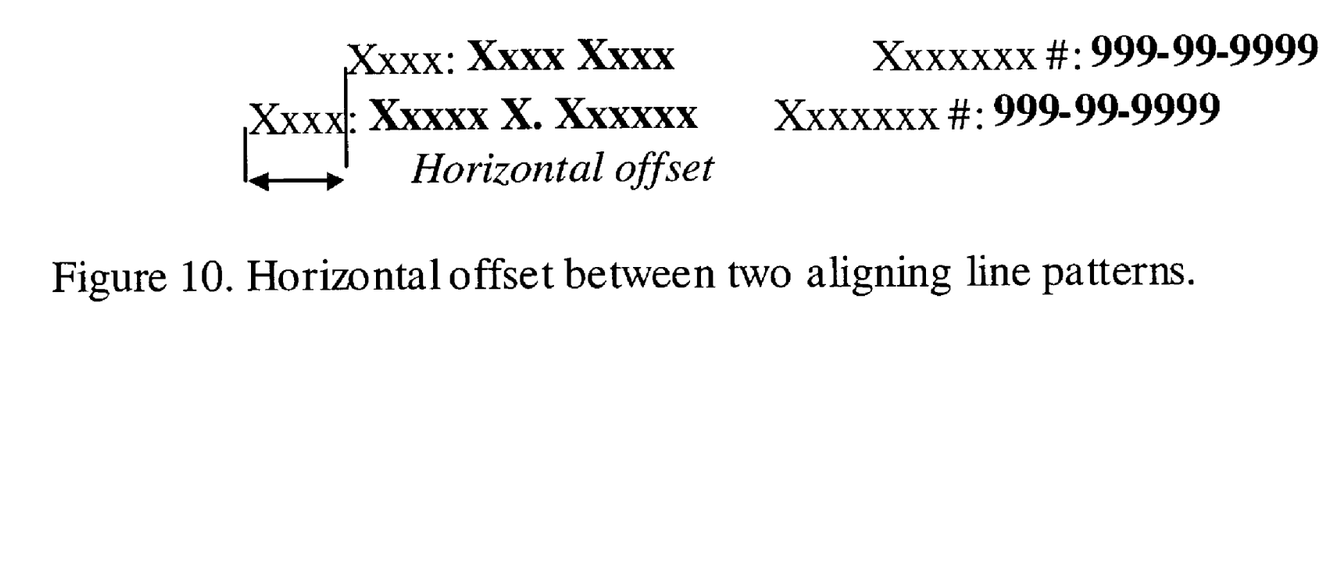
FIG. 10 illustrates horizontal offset between two aligning line patterns, in accordance with preferred embodiments of the present invention.

In order to align any two pages of a document, a fixed number of the most similar line patterns from both pages are collected. For each pair, a horizontal offset is calculated. The offset is measured between correlated character positions that may involve original or generalized characters (FIG. 10). Final offset between the two pages is calculated as an average offset between the largest cluster of similar offsets.

Finding the most similar line patterns involves three processing steps. First, line patterns are generated using generalization variation 2 (numeric and alphabetic characters). Generalization is described in detail below. Next, similarity between pairs of lines is found using an algorithm measuring distance between two strings. The algorithm penalizes each character insertion, deletion, and substitution with an equal cost. Similar line patterns have low ratio (close to 0) of the distance and the length of the smaller line pattern. Finally, the most similar pairs of line patterns are selected as those with the lowest ratio that is below some dissimilarity threshold.

The algorithm used in the process of determining which line patterns are similar does not involve character positional data because this data is not completely reliable due to the misaligned pages. The algorithm calculates edit distance by the dynamic programming techniques as known to those skilled in the art. Given two strings, source string $s_1 s_2 \ldots s_n$, and target string $t_1 t_2 \ldots t_m$, the algorithm finds distance $d_{n,m}$. Intermediate distances $d_{i,j}$ are defined as follows:

$d_{0,0}=0$ $d_{i,0}=d_{i-1,0}+\text{delete cost}$ $d_{0,j}=d_{0,j-1}+\text{insert cost}$ $d_{i,j}=\min\{(d_{i-1,j}+\text{delete cost}), (d_{i,j-1}+\text{insert cost}), (\text{if } (s_i==t_j) \text{ then } 0 \text{ e } d_{i-1,j-1}+\text{substitution cost})\}$ It has been empirically determined that the number of offsets (votes) in the largest cluster should be at least half of all the similar pairs. Due to the complexity of the string alignment algorithm, it is practical to stop searching for the best aligning pairs of line patterns once about fifteen of them have been collected. The larger the overall number of votes, and the larger the ratio between the number of votes in the best cluster and all the votes, the better is the confidence in the data alignment.

Preferred embodiments of the invention leverage a user's ability to distinguish relevant parts of a document from irrelevant parts. The training step information performed by the user involves indicating the structure of one or more records and actual type of contents for extraction, as well as naming the particular data element types that have been indicated. This step links the spatial distribution of characters and the text content to the document component hierarchy (DCH).

The structure and the scope of the record, its various parts, and specific data elements selected for extraction are indicated by drawing bounding boxes around the components. The contents of the record are indicated by drawing a box around the whole record. The table part is indicated by drawing a box around the table contents. This action also implicitly separates the header and the footer parts. Each particular data element or structure is indicated by a separate bounding box and a name is selected from a predefined set of names.

Data elements selected for extraction from the header and footer are outlined and named. In the table part, data elements of only one row need to be defined. In case of a missing column entry, the user may draw an empty box as a column data placeholder. Among many rows in the given table, any row can be selected for defining table data elements; as long as the row is representative of the row type. Any subset of columns can be selected for extraction.

While some embodiments of the invention employ only record and data element specification (foregoing user-specified or -indicated record parts), an advantage of other embodiments in which the user specifies record parts in the DCH and indicates at least the table (the line-to-line repeating part of a record) as a record part is that the user can typically recognize the table more reliably than can a program executing on a computer. This is especially true where not every entry in the table contains data.

Figure 4:
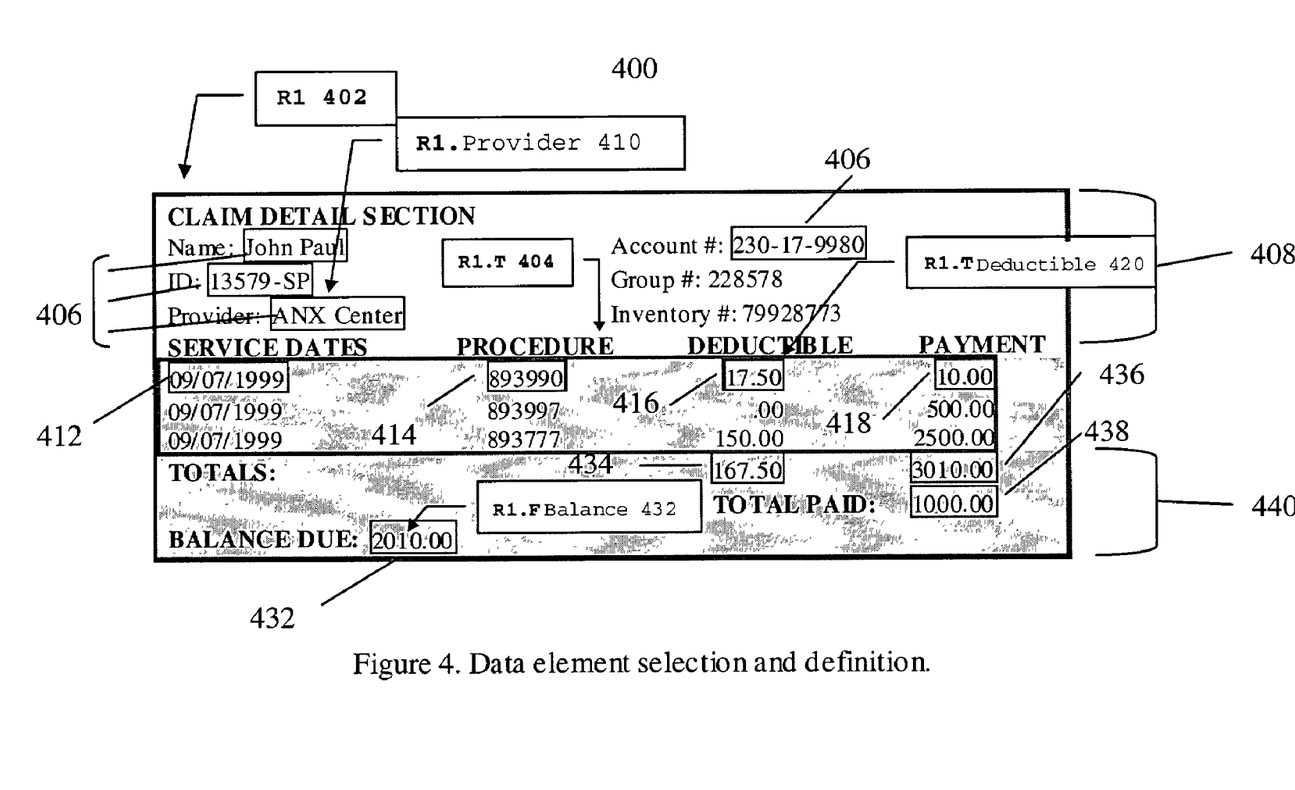
FIG. 4 is an example of data element selection in accordance with a preferred embodiment of the present invention.

Referring to the record 400 illustrated in FIG. 4, the process of a record definition will be described. Two structural parts are outlined: the complete record (R1) 402, and the table inside the record (R1.T) 404. Four (4) data elements 406 are identified within the header 408. For illustrative purposes, the data element ANX Center is shown labeled as R1.Provider 410. The remaining definitions pertain to specific data elements selected for extraction. All data elements selected in the header and footer are outlined and given names. (For picture clarity, only a few names are shown). In the table R1.T 404, data elements for service dates 412, procedure 414, deductible 416, and payment 418 are indicated. As an example, FIG. 4 shows a deductible 416 data element labeled as R1.T.Deductible 420. Likewise, the figure shows data element 2010.00 430 selected and identified as R1.F.Balance 432 in footer R1.F (unlabeled) 440. Additional footer 440 elements are indicated for deductible total (i.e., 167.50) 434, payment total (i.e., 3010.00) 436, and total paid (e.g., 1000.00) 438. "Group" 440 and "inventory" 442 fields were not selected for extraction at this time but they can be added to the model at any time later.

There are a huge number of possible selections for data extraction. For example, a record with 20 data elements can be defined in over a million ways! This number is even larger because preferred embodiments of the present invention allow for grouping of data elements, as well as extracting data with or without descriptors. Provision for meta-data extraction gives an additional flexibility in post-processing of extracted data. However, there is some risk involved in relying on extracted descriptors/metadata. The extracted descriptors may include OCR errors, whereas the names assigned to data elements always will not be as susceptible to that source of error.

Figure 5:
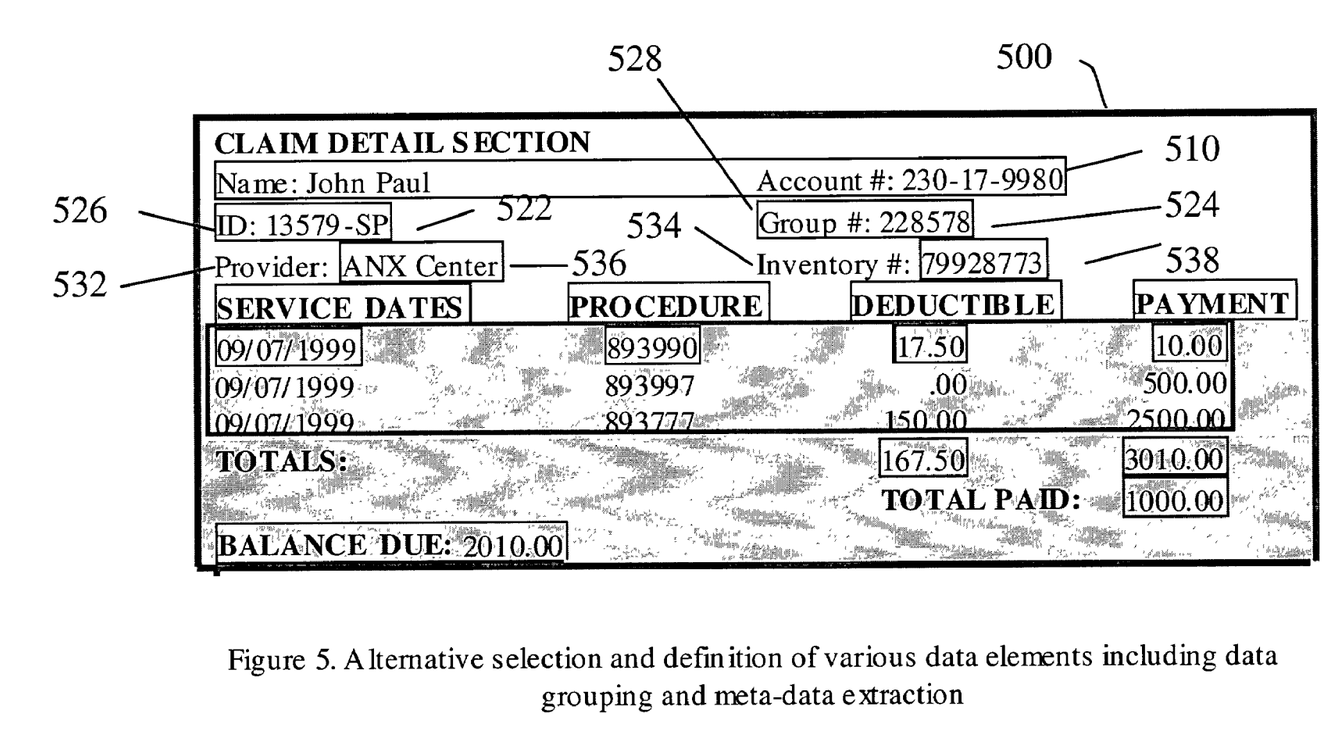
FIG. 5 is another example of data element selection in accordance with a preferred embodiment of the present invention, including meta-data indicated for extraction.

FIG. 5 presents some alternative ways of defining data elements for extraction. The underlying record 500 in FIG. 5 is identical to the record 400 illustrated in FIG. 4. The data elements and corresponding descriptors for Name and Account # are identified as a single data element 510. The two data elements in the header first line are combined and extracted as one line with their descriptors as part of one data element. Data elements 522, 524 from the header second line are extracted separately. They are also proceeded with their descriptors 526, 528, i.e., ID and Group#. The descriptors Provider 532 and Inventory #534 from the third line are not extracted, but the data elements 536, 538 corresponding to those descriptors are indicated for extraction. In addition to the table data, the table header information is defined for extraction. The table header is extracted before the table.

Given the three inputs discussed above, preferred embodiments of the present invention round out the model of the document structure by deriving type definitions for the whole document, each line pattern, each record, and each data element. The document definition contains descriptions that enable recognition of document and record parts and navigation through the document.

In the domain of documents that contain flex-records, we find a "line" of characters a particularly useful unit in document processing. Lines exhibit easily recognizable visual patterns. Spacing between the columns of a table along with column data types clearly identify the table part of a record. Indentation, spacing, meta-descriptors, sequence, and content itself identify other parts of the record or the document. The document model stores generalized line descriptions as line patterns (LP). Generalization of a line description corresponds to identifying the type of character at each position in the line.

Another pattern exploited in the data extraction of structural patterns is the line sequence pattern (LSP). This pattern is maintained by storing the order of line patterns (in preferred embodiments, line patterns are typically stored in the record type definition they are associated with). LPs and LSPs are useful in recognizing and processing various parts of the document, especially enclosed records. There may be gaps between line patterns in the sequence. The gap extent can be estimated based on the training document(s).

Depending on the richness and availability of the source data, a line pattern may be created in at least three variations: variation 1—numeric; variation 2—numeric & alphabetic; variation 3—numeric & alphabetic data. In each variation, spacing between words is captured by filling in with blank characters. In addition, at each variation, numeric data is generalized by turning every digit into a designated character, e.g. '9'. Other methods for indicating the type of as character or character position will be apparent to those skilled in the art.

At the second variation, strings are generalized by turning upper case and lower case letters into designated characters, e.g. "X" and 'x', respectively. Non-alphanumeric characters are left unchanged.

In order to generate a line pattern at the third variation, a sample of similar lines is analyzed and determination is made which words are meta-descriptors and which are data. The distinction is done by comparing similar lines and identifying words that are not identical. Identical words most likely carry meta-descriptors, whereas changing words carry data. The distinction could also be made based on similar words, instead of identical words, in order to neutralize errors introduced by the OCR process. A flexible matching of words would be than applied in place of the strict match. If it is possible to distinguish meta-descriptors from data then the data characters can be turned into the designated characters (X, x), otherwise the line pattern may remain at the second variation of generalization.

Figure 6:
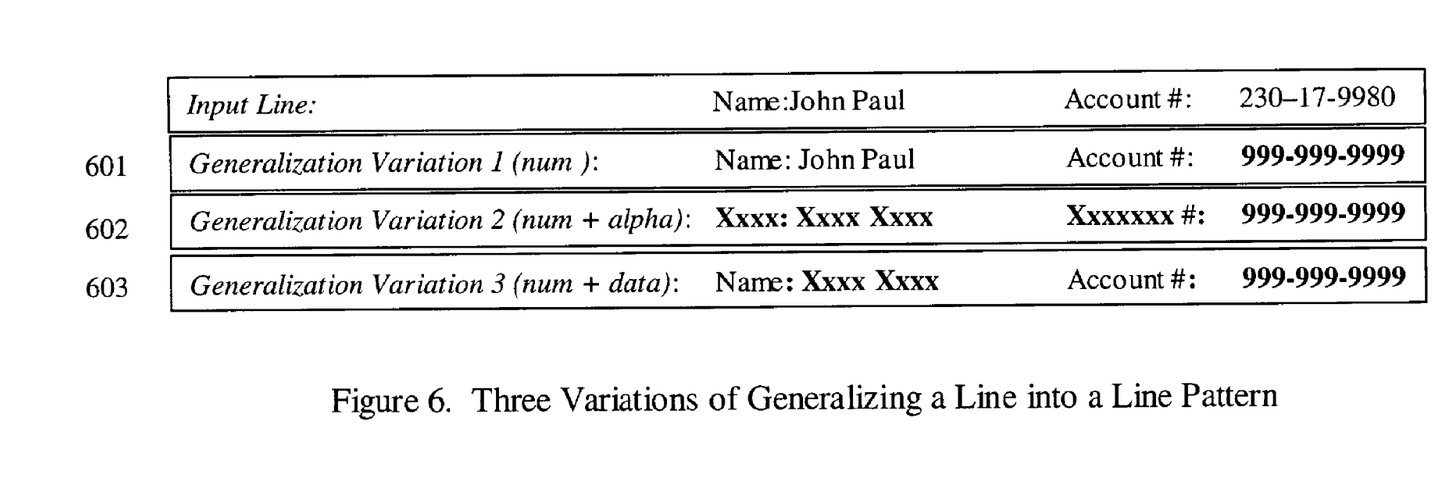
FIG. 6 illustrates variations of generalizing a line pattern in accordance with preferred embodiments of the present invention.

FIG. 6 gives an example of a line generalized to line patterns at each of the three variations. In order to generalize at variations 1 or 2 no similar lines are necessary. Generalization at variation 1 can typically be applied with no loss of useful information because numeric strings are rarely used as meta-descriptors. In FIG. 6 for variation 1 601, numeric data is indicated by the numeric '9.' Generalization at variation 2 is also easily applicable, however, loss of some useful information may occur. For example, such information could be in the form of meta-descriptors that best identify data elements. Generalization at variation 3 can be applied only when similar lines are found in the training document and distinction between data and meta-data can be done with some certainty.

Figure 7:
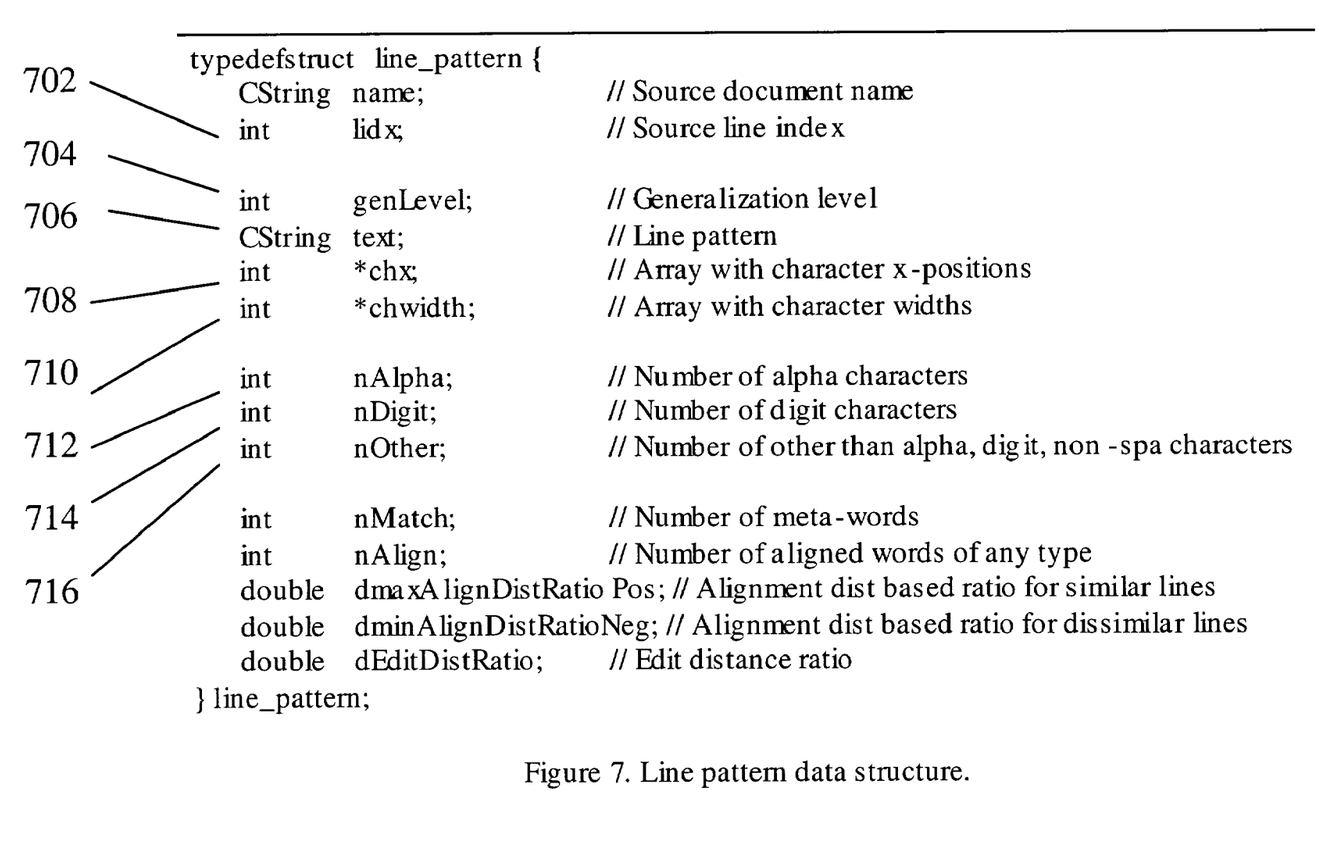
FIG. 7 illustrates a line pattern data structure in accordance with preferred embodiments of the present invention.

For each line pattern, a set of useful statistics is stored, as defined in the type definition shown in FIG. 7. The statistics are calculated by comparing the source lines with the line pattern. They serve as benchmark figures in the process of recognizing document lines. The line pattern type definition stores information about the source of the line pattern 702, identifies its generalization variation 704, and stores a string 706 representing the line pattern as well as character position 708 and width 710. Attributes like number of alpha characters 712, digitnumeric characters 714, other characters 716, number of meta-words 718, number of aligned words 720, and matching ratios are used in the classification process.

In preferred embodiments of the present invention, the character pattern distance between two lines is measured as a ratio of the number of misaligned (substituted, inserted, or deleted) characters and the number of characters in the shorter line. Character alignment is determined based on their X-positions in the lines. A character pattern distance close to zero indicates similar lines, whereas a character pattern distance above one indicates dissimilar lines. A character pattern distance between 0.1 and 0.9 represents a gray area for classification.

In this case, context and two reference statistics from line pattern structure become more useful. The first statistic, dmaxAlignDistRatioPos, is obtained by calculating character pattern distance to a representative sample of similar lines in the training document and selecting the maximum character pattern distance. It is a measure of how dissimilar are all lines represented by the line pattern. The second statistic, dminAlignDistRatioNeg, is obtained by calculating character pattern distance to a representative sample of dissimilar lines in the training document, and selecting the minimal character pattern distance. This is a measure of how similar might be a line that is not like the line pattern. In cases when it is difficult to establish alignment between lines, or the alignment is not reliable, edit distance is calculated (dEditDistRatio) using a known algorithm (see the following discussion on horizontal alignment). The benchmark character pattern distance is measured between the source line with the line pattern.

The sampling of the similar and dissimilar lines can be conducted in the context of a particular part of the document or a record, knowing that some lines will not be classified in certain cases. For example, page header lines do not need to be sampled when classifying lines in the middle of the page.

The record type definition consists of descriptions of the record, its layout and links to its components (e.g., the elementary data elements). Both layout and data elements are described using versatile references to lines and line sequences. For example, each record is explicitly defined by the sequence of lines containing record data elements. In addition, lines that proceed or follow the record or its parts (i.e., LSPs) are predictable due to the line order.

A data element may be located relative to a specific line: it may start in that line, or after or before a line; however, it may never intersect some lines. The order of data elements in the record is dictated by the order of document lines. Two data elements may be in the same line, separated by some lines, in the previous or following line(s), not in a certain line, before or after a specific line, etc.

These concepts are reflected in each record type definition. LP and LSP are two features of document structure used in describing record layout and record components. Each part of a record is characterized by the LPs patterns within the scope of that part, as well as lists of representative line patterns of preceding and following lines (stop lists). The stop lists of line patterns outside the record part are meant to provide additional criteria for terminating processing of the given part when there is uncertainty about that part's continuation.

For example, tables are often followed by a line with totals. The structures of the table and totals lines are usually very similar. A table stop list becomes useful in order to prevent extraction of totals data as table data. In a different case, broken records introduce some uncertainty. A stop list that contains potential lines from the bottom of the page prevents mistakenly extracting data from those lines and directs processing to the next page.

Preceding and following lines are grouped in two different stop lists for moving up or down the document. The lines can be ordered according to the most plausible encounter. For example, when moving down the document, the first line after the given part is placed at the head of the list. In case of moving up to preceding lines, the first line before the given part is placed at the head of the list.

Figure 8:
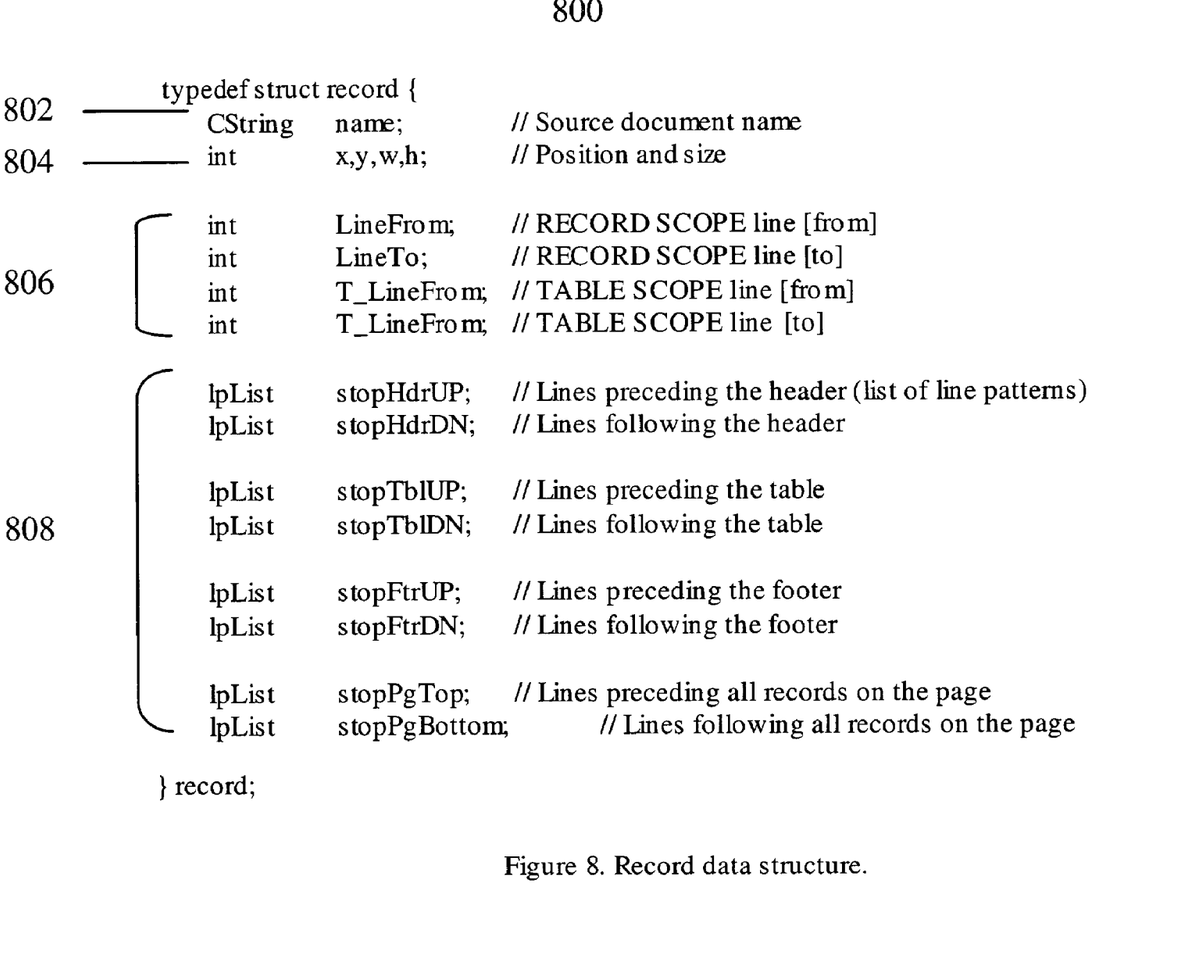
FIG. 8 illustrates a record data structure in accordance with preferred embodiments of the present invention.

FIG. 8 shows an example type definition a record structure 800. Name 802, position, and size 804, along with record and table scope 806 provide source information about the record location and size in the training document. Next, four pairs of stop lists 808 for each part of the record as well as all records on the page are declared.

Figure 9:
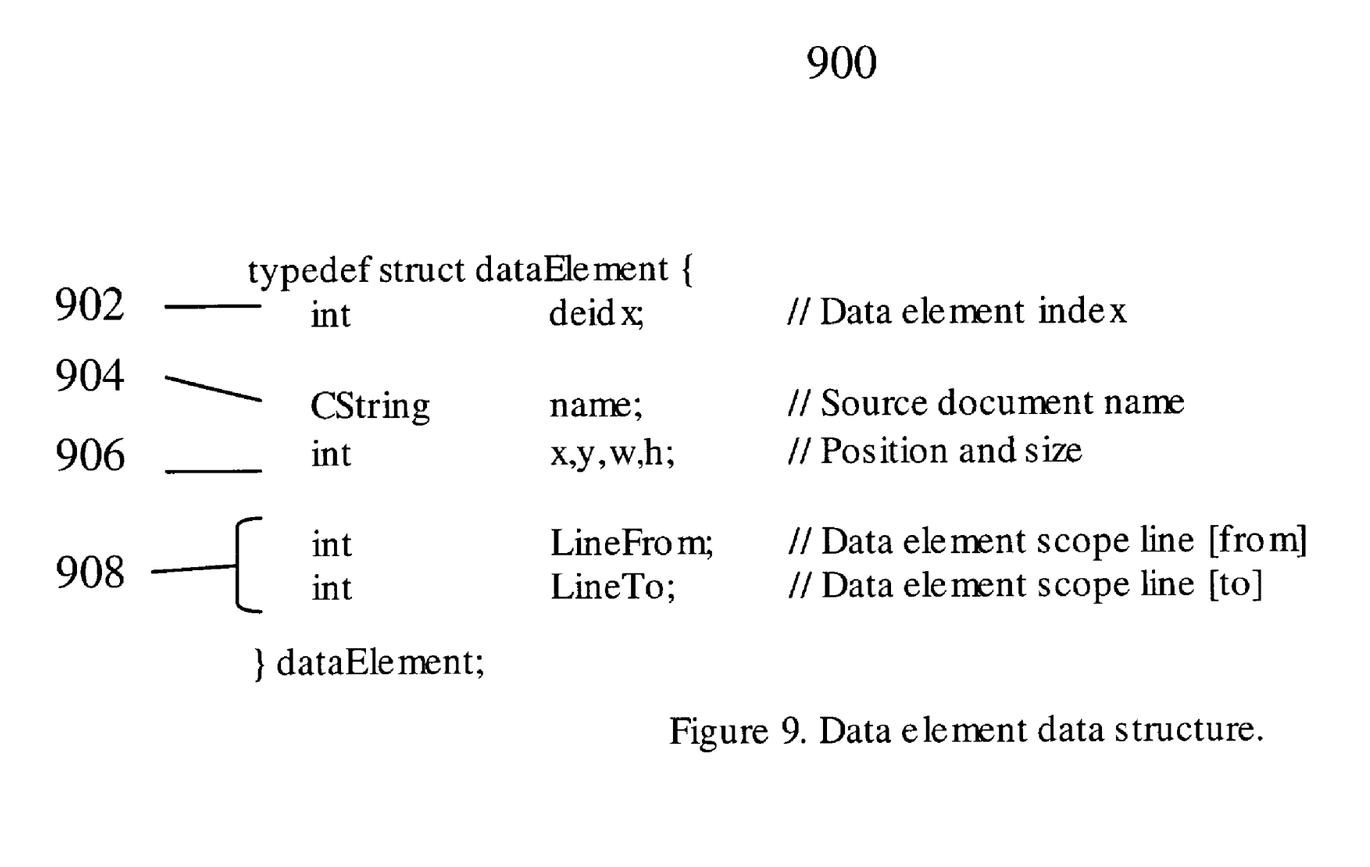
FIG. 9 illustrates a data element data structure in accordance with preferred embodiments of the present invention.

Data element type specifications describe specific fields declared in a record. Similarly to the record type specifications, data element type specifications also rely on the line patterns and their sequence in a document. As illustrated in FIG. 9, at a minimum a data element type definition 900 stores some identification information like its index 902, source document name 904, position and size 906 and range of lines which it spans 908. The remaining information can be derived from this data and the document and record models. For example, document model supplies line patterns for the lines occupied by the data element, and lines that precede and follow the element. From the location of the record and the data element, their relative placement also can be inferred.

The data extraction process is driven in reference to the model developed in the training stage. Data extraction from a multi-page subject document is broken down to data extraction from single pages of the document. Each page is processed independently of the previous and following pages. The data extracted from separate pages can be reassembled into complete structures based on the order of extraction and meta descriptors associated with the extracted data. The independent page processing assumption makes sense in view of the discontinuities introduced by page footer and header information as well as simplifies extraction from broken records.

Before the search and capture of data elements from a subject is performed, each page is preprocessed by image processing (deskew, despeckle), OCR, and data horizontal alignment. OCR generates information about the subject document pages including character ASCII codes, XY positions, widths, and heights. In addition to OCR, each subject document description is enhanced by several means of indexing data at the page, line, and character level as noted earlier for the training document.

Page processing, in preferred embodiments, starts with the search for the beginning of the record. If the beginning of the record is not found on the page or some number of lines were skipped in the process, then the skipped section is analyzed to find possible ending parts of the record that might have started on the previous page. If any parts of the previous record are found, then they are extracted (as described below). If there is the beginning of the new record, then its extraction is initialized.

The record data extraction process works in cycles predetermined by the order of record parts (header, table, footer), and the order of data elements. In preferred embodiments, this order is the order in the DCH. The order of individual data elements within a record part is determined based on the Y (vertical) position of the beginning of given data elements.

Each part is processed until all data elements from that part are extracted (or determined not to be present) or a break in the part is encountered, such as the start of the following part or the end of the page. There are two elementary phases involved in the data element extraction process: searching for the data element and its capture.

Search for the data elements is conducted either in reference to the beginning of the record (data in the header part and the first row of the table) or in reference to already captured data elements (table data in the rows following the captured ones, footer data in reference to the last row of a table). Searching for a record involves obtaining from the record type definition direct and indirect information characterizing the beginning of the record. This information is provided in the form of line patterns and their relations to the beginning line.

Line patterns may directly describe the beginning of the record or may only help in searching for the record. For example, a direct line pattern may simply correspond to the first line of the record and finding a good match guarantees successful completion of the search. Indirect line patterns may provide information about lines that are not part of the record, so lines matching such patterns should be omitted.

Once a reference line is determined, the relationship between the line pattern and the searched-for element is utilized to find actual location. In particular, the relationship dictates the next action: should we stay in the same line or move a number of lines forward or backward. The moves occur with the support of the indirect information. Specifically, if the searched-for data element is located a number of lines below the reference line, according to the document model, then the current line is not only advanced to that line, but also the move is monitored by testing skipped and target lines for any irregularities.

The tests include checking that the current record part is not broken, and determining if additional lines were inserted (this includes extra lines resulting from noisy OCR). Depending on the recognized irregularity, a proper action is taken.

In most cases, the line including the searched-for subject document data element will be found, and the data capture may be initialized. Note that *finding* a data element does not require an exact match to the criteria; typically a strong correspondence will suffice. This starts with determining the horizontal (x) position of the beginning of the data element. Horizontal position data is readily available from the data element type specification's (x,y,w,h) description of the data element adjusted for the horizontal offset of the current page.

The initial width of the data element assumed from the model is subject to adjustments on both sides by expansion and contraction. Before the expansion adjustment, a measure is taken on available space between the subject document data element and characters immediately preceding and following characters in the model line. If there is sufficient space then the characters are added until the captured word is completed or there is no more space to expand. In case the width of the data element is too large, e.g. there are fewer characters in the current document than in the model, the final width will be determined based on the size of the actual characters enclosed in the approximate bounding box.

Figure 11:
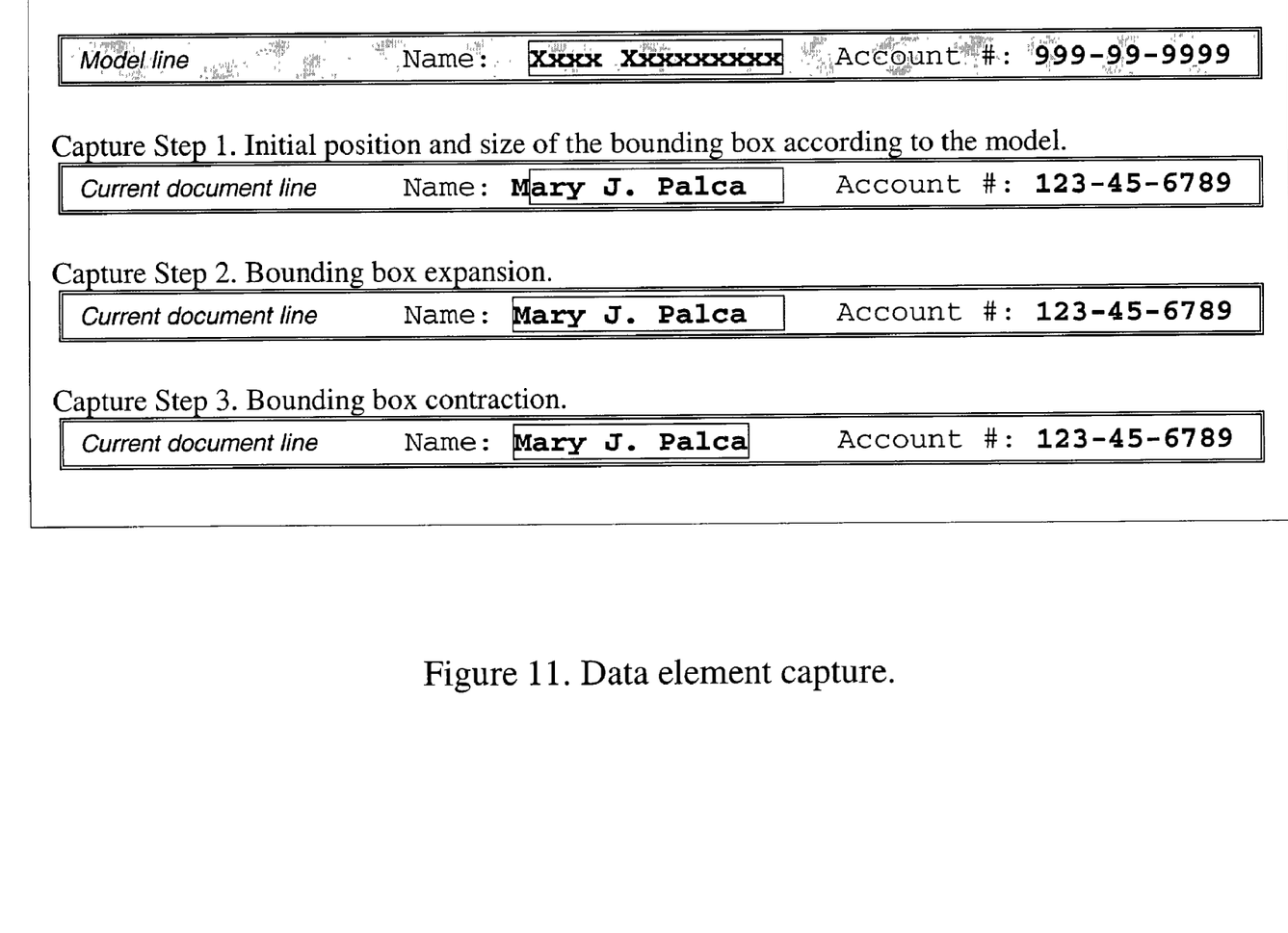
FIG. 11 illustrates steps in data element capture in accordance with preferred embodiments of the present invention.

FIG. 11 illustrates the steps during the capture process involving a data element within one line. In the case of data elements spanning multiple lines, Step 2 is followed by vertical expansion. The lines following the data element top line are verified to carry the remainder of the data element, and the bounding box is expanded accordingly. Step 3, contracting the size of the data element, performs both horizontal and vertical contraction.

In preferred embodiments of the invention, verification is performed after each component has been extracted from the document. In alternate embodiments, verification is performed at end of the process. Verification involves both record data elements and structures they are part of. Data element verification involves testing if the element's content matches the general description of that data element acquired from the training document and from the user, or inferred from separate or combined inputs, and stored in the document, record, and data element models. The general description may include data types and scope of valid values. The data element is assigned a confidence based on the degree of match.

In preferred embodiments, after extracting a part of the record, such as header, footer, or a row from the table, that part of the record is also verified. The verification involves testing for completeness of the part and the integrity of mutual relationships between involved components. One of the tests may involve testing geometric or spatial relationships between components. More specifically, the tests may involve comparing both vertical and horizontal alignment of the extracted data elements. Two measures are produced to reflect confidence in the extracted substructure: the number of extracted components out of the number of expected components in the part, and the number of correct relationships out of the total number of tested relationships.

Another verification involves testing for completeness of the record. Final verification involves testing if the page or the document contains any unprocessed areas that could fit a record structure but for some reason no data was extracted. In case such areas exist, preferred embodiments of the invention report a list of suspected regions with the confidence level that reflects degree of fit between the record model and the region.

I claim:

1. A method for horizontally aligning a first region of a document with a second region of a document, each region characterized by a plurality of sub-regions, the method comprising:

determining a type for each of a plurality of sub-regions in each region;

determining an edit distance for each typed first region sub-region, typed second region sub-region pair;

determining a first region sub-region offset for those pairs characterized by an edit distance not greater than a threshold;

determining a first region offset as a function of the first region sub-region offsets offsetting the first region by the offset, wherein determining a first region offset as a function of the first region sub-region offsets comprises calculating the average offset between the largest cluster of similar offsets.

2. The method as in claim 1, wherein
each region comprises a page,
each sub-region comprises a line.

3. The method as in claim 1, wherein
determining a type for each of a plurality of sub-regions in each region comprises generalizing each sub-region.

* * * * *